(12) United States Patent
Zhou et al.

(10) Patent No.: US 6,263,012 B1
(45) Date of Patent: Jul. 17, 2001

(54) RECEIVER APPARATUS FOR CDMA COMMUNICATION SYSTEM

(75) Inventors: Changming Zhou; Xuping Zhou; Guoliang Shou, all of Tokyo; Mamoru Sawahashi; Fumiyuki Adachi, both of Kanagawa, all of (JP)

(73) Assignee: Yozan, Inc., Tokyo (JP)

( * ) Notice: Subject to any disclaimer, the term of this patent is extended or adjusted under 35 U.S.C. 154(b) by 0 days.

(21) Appl. No.: 09/174,910

(22) Filed: Oct. 19, 1998

(30) Foreign Application Priority Data

Oct. 20, 1997 (JP) .................................................... 9-304887

(51) Int. Cl.[7] .............................. H04B 1/69; H04B 7/216
(52) U.S. Cl. ............................ 375/152; 370/335; 370/342
(58) Field of Search ....................................... 375/147, 152, 375/343; 370/335, 342

(56) References Cited

U.S. PATENT DOCUMENTS 5,974,038 * 10/1999 Shou et al. ............................ 370/335
6,064,690 * 5/2000 Zhou et al. ............................ 375/147

* cited by examiner

Primary Examiner—Temesghen Ghebretinsae
(74) Attorney, Agent, or Firm—Pillsbury Winthrop LLP

(57) ABSTRACT

An output of analog complex matched filter is simplified to be a one dimensional signal such as electrical power. Multi-path detection is performed by the simplified signal. The output of the matched filter is received and processed only when peaks occur in the one dimensional signal.

8 Claims, 4 Drawing Sheets

RECEIVER APPARATUS FOR CDMA COMMUNICATION SYSTEM

DETAILED DESCRIPTION OF THE INVENTION

1. Field of the Invention

The present invention relates to a receiver apparatus for code-division-multiple-access (CDMA) communication system, particularly to a receiver apparatus having an analog matched filter for demodulation and a rake combiner for multi-path signal.

2. Prior Art

Spread spectrum communication systems have gained a lot of attention in the field of mobile communication and wireless local area network (LAN) due to their high frequency efficiency and capabilities.

In the CDMA communication, the transmission signal is multiplied by a spreading code and the received signal is despread by the same spreading code at the receiver side.

A complex matched filter is used to perform the despread in high speed operation. A matched filter of digital circuit is large in circuit size and consumes a lot of electrical power. The inventors of the present invention proposed matched filters of a high speed and low power by analog multiplication and addition comparison to the circuit's in the Japanese patent publication 06-164321, 06-164320 and 07-212438.

A multi-path signal is generated by an original radio wave impinging surrounding buildings and other structures and causing a reflection of the original radio wave. A plurality of correlation peaks occurs within one symbol period when the multipath signal is despread by the matched filter. A plurality of correlation peaks of higher levels are selected for each complex component, synchronized and combined. The path selection and rake combining are performed by a digital circuit, so the complex components, i.e., in-phase and quadrature components of the output of the analog matched filter, have to be converted by an A/D converter into a digital data. At least a pair of A/D converters which has a higher speed than the chip rate when an over-sampling is executed, is necessary. However, this has an adverse effect of decreasing the electrical power.

SUMMARY OF THE INVENTION

An of the present invention to provide circuits for multi-path detection and phase compensation of a small circuit size and low electrical power consumption.

According to the present invention, an output having a complex matched filter is converted into a signal of one dimension and the multi-path detection is performed according to the signal. The analog complex components of the output from the matched filter is held at its peaks by an analog sampling and holding circuit and is converted into digital signals.

PREFERRED EMBODIMENT OF THE PRESENT INVENTION

Hereinafter, an embodiment of a receiver apparatus for code-division-multiple-access (CDMA) communication system is described with reference to the attached drawings.

Figure 1:
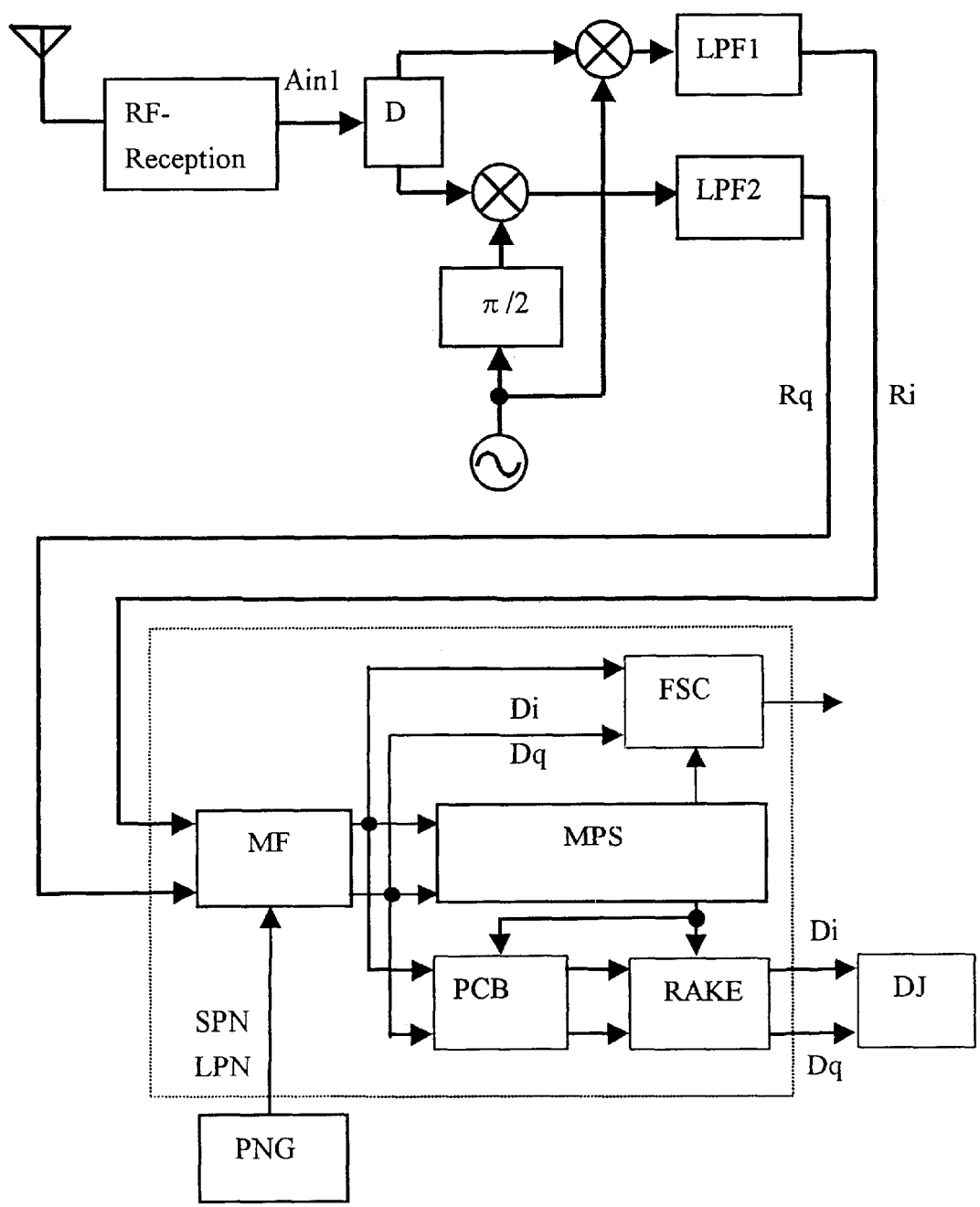
FIG. 1 is a block diagram of an embodiment of a receiver apparatus for CDMA communication system according to the present invention, of the invention.

In FIG. 1, a signal Ain1 received by an antenna and a radio frequency (RF) receiver is output as an intermediate frequency (IF) wave. The IF signal is divided by a quadratic detector into two signals of an in-phase component (I-component or real-component) and a quadrature-component (Q-component or imaginary-component). These components are processed by a low-path filters LPF1 and LPF2, respectively, so that carrier component is removed. Then, the I-component Ri and Q-component Rq are extracted to be input to a matched filter MF. The matched filter MF receives a short spreading code sequence SPN or a long spreading code sequence LPN from a spreading code generator PNG so as to multiply the I-and Q-components by SPN or LPN.

An output of the matched filter MF is parallelly input to a frame synchronization circuit FSC, to a multi-path detection circuit MPS and to a phase compensation block PCB. In the FSC, the frame synchronization is detected from a path of the maximal level. In the PCB, a plurality of signals in the output from the matched filter is held at multi-path timings in response to an output of the multi-path direction circuit MPS and the signals are synchronized in phase.

An output of the phase compensation circuit PCB is input to a rake combiner RAKE for rake combining. The rake combiner receives information on the number of signals in the multi-path signal and on their delay time, so as to perform the rake combining. The rake combiner RAKE outputs I-component Di and Q-component Dq to a data judgment circuit DJ for restoring the data transmitted.

The multi-path detection circuit MPS operates in "intermittent mode" in response to an output from the matched filter MF. When the multi-path is detected and determined, the multi-path detection is unnecessary until the synchronization becomes incomplete due to some asynchronism of a predetermined level. Then, only the level of the asynchronism should be observed. This working condition is called the "intermittent mode". The MPS works once in several symbol periods and sleeps in other time.

Figure 2:
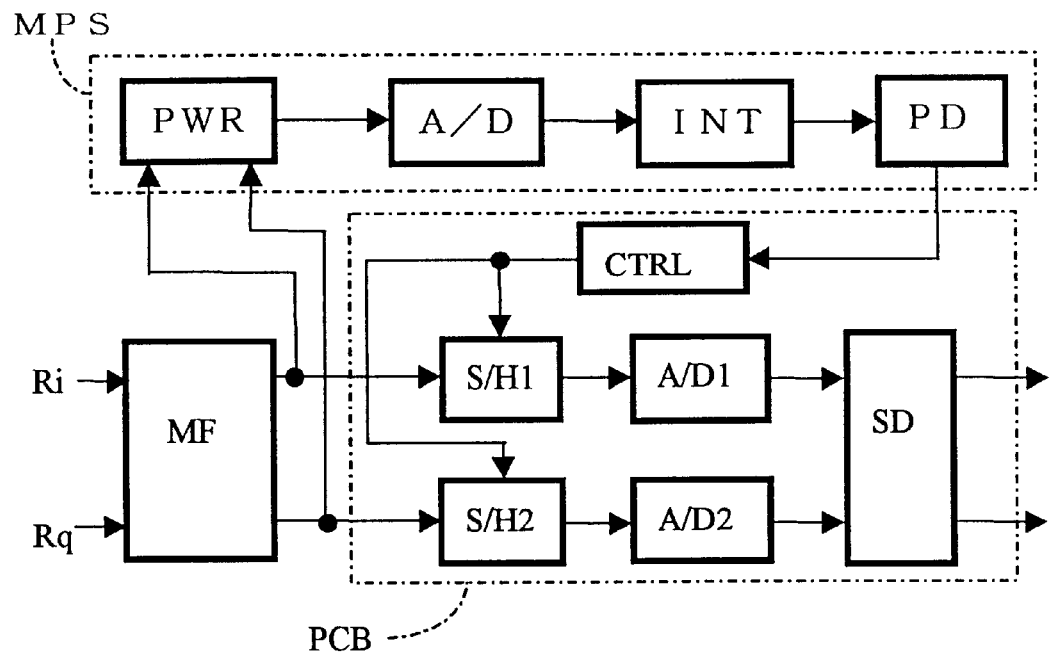
FIG. 2 is a block diagram of a multi-path detection circuit according to an embodiment.

In FIG. 2, the multi-path detection circuit MPS includes an analog signal power detection circuit PWR as an analog signal level detection circuit. The complex components of the output of the matched filter MF are input to this analog signal power detection circuit PWR. An output of the analog signal power detection circuit PWR is input to an A/D converter So that it is converted into a digital signal. After the A/D, there are serially connected a recursive integration circuit INT and a peak detection circuit PD. The output of the A/D is recurrently integrated. The peak detection circuit PD detects whether the peaks output of the INT exceeds a predetermined level. The analog signal power detection circuit PWR calculates a signal power $\sqrt{Di^2 + Dq^2}$ from the components Di and Dq. Since the power is calculated first, only one process system is necessary after the PWR. Thus, the circuit size becomes smaller and the power consumption reduced in comparison to conventional circuit.

The recursive integration circuit INT adds signals of corresponding timing of each symbol period during a plurality of symbol periods in order to reduce the influence of noise. The peak detection circuit PD compares the calculated signal power with a predetermined threshold so as to select one or more paths (multi-path signals). The selection result is input to a control circuit CTRL in the phase compensation block PCB. The PCB includes sampling and holding circuit S/Hi and SH2 for receiving, for each path, the components Di and Dq, respectively. The sampling and holding circuits S/H1 and S/H2 are controlled by the CTRL so as to hold the output of the matched filter MF only during the timing when peaks are detected in the calculated signal power. Outputs of the sampling and holding circuits S/H1 and S/H2 are input to A/D converters A/D1 and A/D2, respectively, so as to be converted into digital signals. The signals are detected by a coherent detector SD and input to the rake combiner. Since peak detection has already been completed before the A/D conversion, the process speed of the A/D conversion, only for peaks, is much slower than a A/D conversion of the total signal. The process speed is about 10% to several ten % of the full sampling A/D conversion. When the spreading ratio is 128, the order of over-sampling is two (double-sampling) and the number of multi-path is four, the A/D conversion speed is decreased to 264/512=52%. The circuit size and power consumption are decreased.

Figure 3:
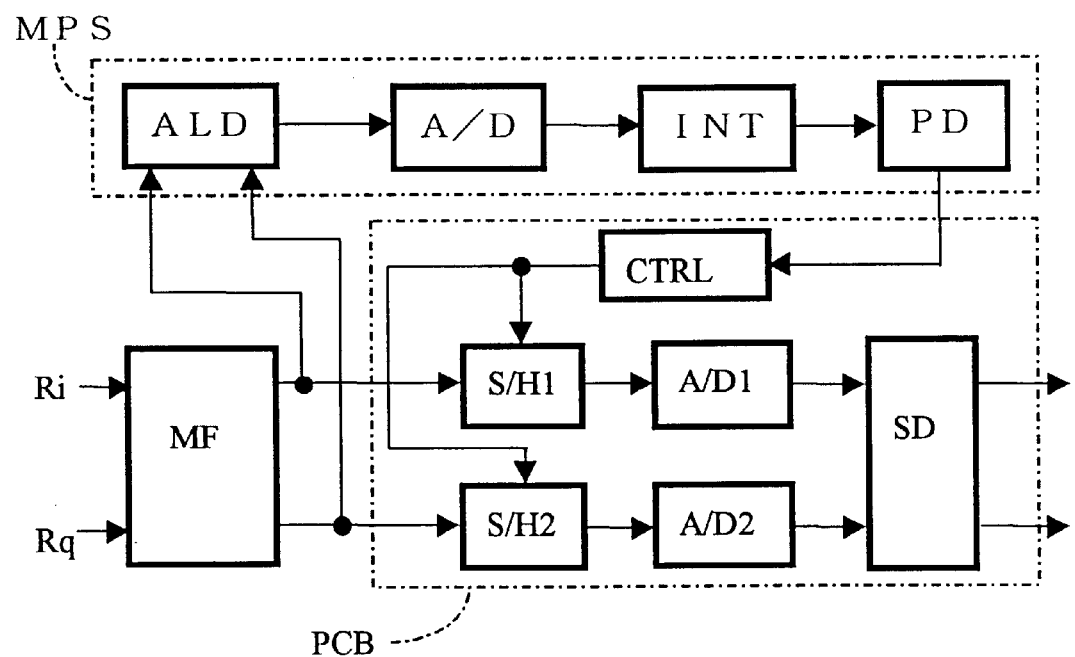
FIG. 3 is the first variation of the multi-path detection circuit.

FIG. 3 shows the second embodiment of a multi-path detection circuit according to the present invention. In comparison to FIG. 2 detection circuit, an absolute level ALD is applied as the analog signal level detection circuit instead of the PWR. The circuit ALD calculates an addition |Di|+|Dq| of the absolute value of components Di and Dq. Then, the calculation can be performed by a single system similar to the circuit in FIG. 2 the circuits of FIG. 3 is simpler than the circuit in FIG. 2 However, the calculation accuracy of the circuit of FIG. 3 is lower than the circuit in FIG. 2.

Figure 4:
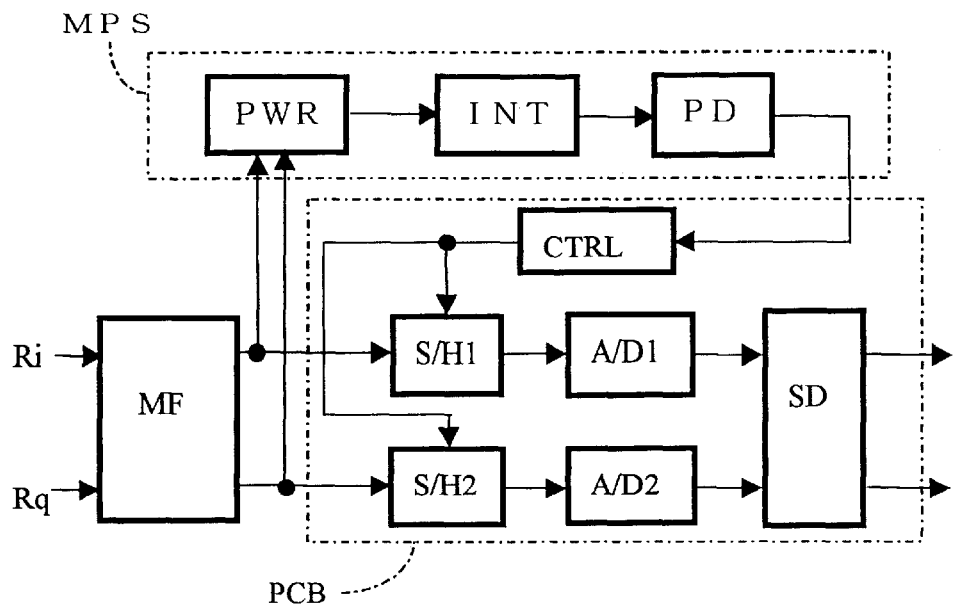
FIG. 4 is the second variation of the multi-path detection circuit.

FIG. 4 shows the third multi-path detection circuit in which the A/D converter at the input side is omitted. Thus, the recursive integration circuit INT and the peak detection circuit process the analog signal in its analog from the multi-path detection circuit is simplified by such construction.

The analog signal power detection circuit PWR is a circuit for calculating an absolute value of a complex number. The signal power Mag is approximately calculated using formula (1).

$$\text{Mag} = {}^{10}\!/_{\!11}\text{Max}\{\text{Abs}(I), \text{Abs}(Q)\} + {}^{5}\!/_{\!11}\text{Min}\{\text{Abs}(I), \text{Abs}(Q)\} \tag{1}$$

In formula (1), the symbols I and Q represent the real and imaginary components, respectively.

Figure 5:
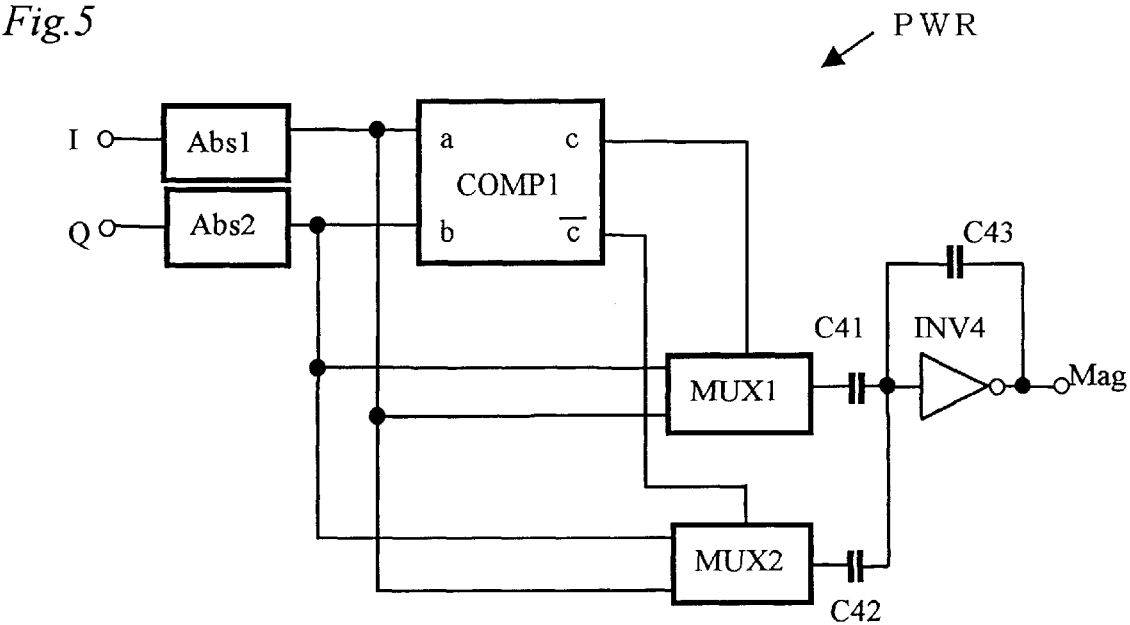
FIG. 5 is a circuit diagram of an analog-signal-power detection circuit in the multi-path detection circuit.

FIG. 5 shows an embodiment of the analog signal power detection circuit PWR of the absolute value approximation. Absolute value circuit Abs1 and Abs2 are connected to the real and imaginary components I and Q, respectively. Outputs of the circuits Abs1 and Abs2 are input to a comparator COMP1, and are parallelly input to two one-input-two-outputs multi-plexers MUX1 and MUX2. The multi-plexers MUX1 and MUX2 alternatively output one of the inputs in response to an output of the comparator COMP1. The multi-plexer MUX1 selects one of the inputs and the multi-plexer MUX2 selects the other inputs. When the output of Abs1 is equal to or larger than the output of Abs2, MUX1 selects the output from Abs1 and MUX2 selects the output from Abs2. When the output of Abs1 is smaller than the output of Abs2, MUX1 selects the output from Abs2 and MUX2 selects the output from Abs1. Outputs of the multi-plexers MUX1 and MUX2 are input to capacitaces C41 and C42 at their input side, respectively, and the output side of the capacitances are commonly connected to an input of an inverting amplifier INV4. A capacitive coupling is constructed by C41 and C42. An output of the inverting amplifier INV4 is connected through a feedback capacitance C43 back to its input. The capacitance ratios are as follows:

$$\frac{C41}{C43} = \frac{10}{11} \tag{2}$$

$$\frac{C42}{C43} = \frac{5}{11} \tag{3}$$

Therefore, formula (4) is true when $I \geq Q$ and the formula (5) is true when $I<Q$.

$$Mag = \frac{10}{11}Abs(Q) + \frac{5}{11}Abs(I) + \frac{Vdd}{2} \tag{4}$$

$$Mag = \frac{10}{11}Abs(I) + \frac{5}{11}Abs(Q) + \frac{Vdd}{2} \tag{5}$$

Figure 6:
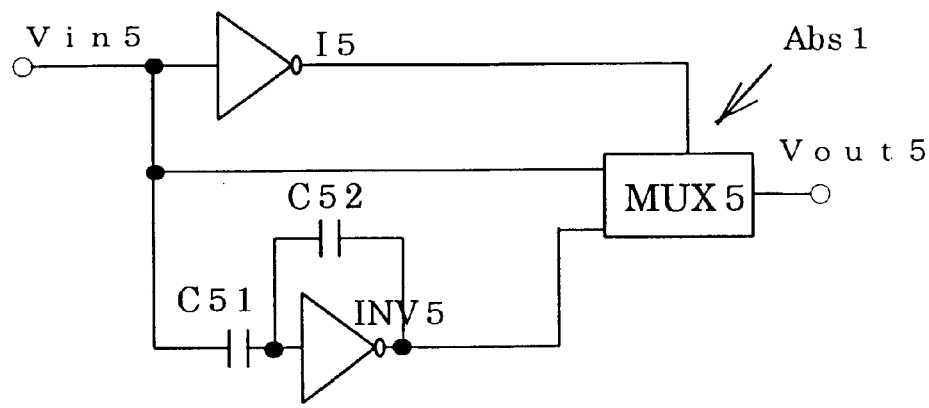
FIG. 6 is a circuit diagram of an absolute circuit in the analog-signal-power detection circuit.

As shown in FIG. 6, the absolute approximation circuit Abs1 includes a CMOS inverter I5 for judging whether an input voltage Vin5, corresponding to I in FIG. 4, exceeds a threshold $$\frac{Vdd}{2}$$

or not. The CMOS inverter I5 outputs Vdd when Vin5 does not exceed the threshold and the output is inverted when Vin5 exceeds threshold.

The input Vin5 is input through a capacitance C51 to an input of an inverter circuit INV5 an output of which is connected through a feedback capacitance C52 to its input. Since C51 and C52 have the same capacities, INV5 outputs an inversion of Vin5 with high accuracy as well as with good stability. Vin5 or its inversion is input to a multi-plexer MUX5 which is controlled by the output of I5. MUX5 outputs Vin5 when $$Vin5 \geq \frac{Vdd}{2},$$

and outputs the inversion (Vdd−Vin5) when $$Vin5 < \frac{Vdd}{2}.$$

The absolute circuit Abs2 is similar to Abs1, so the description therefore is omitted.

Figure 7:
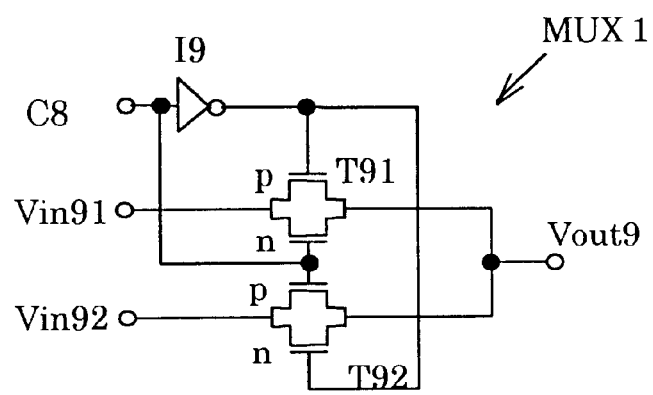
FIG. 7 is a circuit diagram of a multi-plexer in the absolute circuit.

FIG.7 shows the multi-plexer MUX1. MUX1 includes a pair of MOS switches T91 and T92 receiving at their inputs input voltages Vin91 and Vin92, respectively. The MOS switch T91 has a nMOS receiving a gate control signal C8 and a pMOS receiving an inversion of C8 generated by an inverter I9. While, the MOS switch T92 has a pMOS receiving a gate control signal C8 and a nMOS receiving an inversion of C8. The switches T91 and T92 are alternatively closed so as to output Vin91 or Vin92 as an output Vout9.

The multi-plexer MUX2 and MUX5 are similar to MUX1, so the description therefor are omitted.

What is claimed is:

1. A receiver apparatus for CDMA communication system, comprising:

an analog complex matched filter for holding successive input signals, for multiplying complex components of said input signal by PN code sequences, respectively, for summing said multiplication results of said complex components and for outputting said summation result as an output of said analog complex matched filter having complex components;

a multi-path detection circuit for detecting a predetermined number of multi-path signals according to said output of said analog complex matched filter, said multi-path detection circuit comprising (1) an analog signal level detection circuit for calculating one dimensional analog signal levels from said output of said analog complex matched filter and (2) a phase detection circuit for detecting phases of peaks of said one dimensional analog signal levels and for outputting said phases of peaks;

a phase compensation circuit comprising (1) a sampling and holding circuit for holding said output of said analog complex matched filter in response to said phases of peaks detected by said phase detection circuit and (2) a pair of A/D converters for converting said output of said sampling and holding circuit to a digital signal; and a rake combiner for rake combining outputs of said phase compensation circuit.

2. A receiver apparatus for CDMA communication system according to claim 1, wherein said one dimensional analog signal levels calculated by said analog signal level detection circuit is a square root of an addition of second power of said complex components.

3. A receiver apparatus for CDMA communication system according to claim 1, wherein said one dimensional analog signal levels calculated by said analog signal level detection circuit is an addition of absolute values of said complex components.

4. A receiver apparatus for CDMA communication system according to claim 1, said multi-path detection circuit further comprising a recursive integration circuit for adding outputs from said A/D converter of the multi-path detection circuit at corresponding timing of a plurality of symbol periods and for outputting a result of said addition to said phase detection circuit, each of said symbol periods being defined by said multiplication of each of said PN code sequences.

5. A receiver apparatus for CDMA communication system according to claim 1, said analog signal level detection circuit comprising;

a first absolute value calculation circuit receiving a first input voltage corresponding to a real component of said complex components;

a second absolute value calculation circuit receiving a second input voltage corresponding to an imaginary component of said complex components;

a comparator for outputting alternatively said real or imaginary components in response to a comparison of said complex components with each other;

a capacitive coupling comprising first and second capacitances connected to said first and second input voltages, respectively, outputs of said capacitances being connected with each other for weighting integration of said first and second input voltages;

an inverting amplifier connected to said outputs of said capacitances of said capacitive coupling; and a feedback capacitance connecting an output and an input of said inverting amplifier.

6. A receiver apparatus for CDMA communication system according to claim 4, said recursive integration circuit comprising an analog circuit.

7. A receiver apparatus for CDMA communication system according to claim 4, said recursive integration circuit comprising a digital circuit.

8. A receiver apparatus for CDMA communication system according to claim 1, wherein said multi-path detection circuit operates intermittently according to said output of said analog complex matched filter.

* * * * *

UNITED STATES PATENT AND TRADEMARK OFFICE
CERTIFICATE OF CORRECTION

PATENT NO.   : 6,263,012 B1
DATED        : July 17, 2001
INVENTOR(S)  : Zhou et al.

It is certified that error appears in the above-identified patent and that said Letters Patent is hereby corrected as shown below:

<u>Title page,</u>
Please change: "[73] Asignee: Yozan, Inc., Tokyo (JP)]". to
-- [73] Assignee: Yozan, Inc., Tokyo (JP) and NTT Mobile Communications Network, Inc., Tokyo (JP) --.

Signed and Sealed this

Fourteenth Day of May, 2002

*Attest:*

JAMES E. ROGAN
*Attesting Officer*    *Director of the United States Patent and Trademark Office*